US008298975B2

(12) United States Patent
Hasegawa et al.

(10) Patent No.: US 8,298,975 B2
(45) Date of Patent: Oct. 30, 2012

(54) SINTERED COMPACT, PROCESS FOR PRODUCTION THEREOF, AND OPTICAL ELEMENT

(75) Inventors: Masato Hasegawa, Itami (JP); Tomoyuki Ueno, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 57 days.

(21) Appl. No.: 12/674,409

(22) PCT Filed: May 20, 2009

(86) PCT No.: PCT/JP2009/059266
§ 371 (c)(1),
(2), (4) Date: Feb. 19, 2010

(87) PCT Pub. No.: WO2009/142238
PCT Pub. Date: Nov. 26, 2009

(65) Prior Publication Data
US 2011/0176958 A1 Jul. 21, 2011

(30) Foreign Application Priority Data

May 23, 2008 (JP) .................................. 2008-135823

(51) Int. Cl.
*C04B 35/553* (2006.01)
*C04B 35/547* (2006.01)
*C04B 35/443* (2006.01)

(52) U.S. Cl. ........ 501/151; 501/120; 501/127; 252/564; 359/796; 359/642; 359/718

(58) Field of Classification Search .................. 501/120, 501/151, 127; 252/584; 359/796, 642, 718
See application file for complete search history.

(56) References Cited

U.S. PATENT DOCUMENTS 5,502,015 A * 3/1996 Shibata et al. ................ 501/151
(Continued)

FOREIGN PATENT DOCUMENTS
EP 1 895 020 A1 3/2008
(Continued)

OTHER PUBLICATIONS

Hasegawa et al., "Optical Characteristics of a Dense ZnS Sintered Body Allowing Infrared Transmittance", SEI Technical Review, Mar. 2002, No. 160, pp. 73-80, Japan.

(Continued)

*Primary Examiner* — Karl Group
(74) *Attorney, Agent, or Firm* — Global IP Counselors, LLP

(57) ABSTRACT

There is provided a sintered body that does not readily deform during use and that allows a high flexibility for the design of surface layers, a method for manufacturing the sintered body, and an optical component including the sintered body. The method for manufacturing a sintered body includes a sintered body having a predetermined shape, the sintered body having a ceramic base material, the method for manufacturing a sintered body comprising a step for preparing a ceramic preform, a step for using a predetermined mold having an upper die and a lower die to hot-press the ceramic preform to form a pressure-sintered body, and a step for cooling the pressure-sintered body while applying a pressure load of approximately 5% or more and 100% or less (and preferably approximately 20% or more and 40% or less) of the pressure load applied during the step for forming the pressure-sintered body.

8 Claims, 3 Drawing Sheets

U.S. PATENT DOCUMENTS

| | | | | |
|---|---|---|---|---|
| 5,575,959 A | * | 11/1996 | Harris et al. | 264/1.21 |
| 6,111,689 A | * | 8/2000 | Shibata | 359/356 |
| 6,863,842 B2 | * | 3/2005 | Hasegawa | 252/584 |
| 8,110,140 B2 | * | 2/2012 | Hasegawa | 264/663 |
| 2004/0212107 A1 | * | 10/2004 | Hasegawa | 264/1.21 |
| 2007/0091472 A1 | * | 4/2007 | Alkemper et al. | 359/796 |
| 2009/0114886 A1 | | 5/2009 | Tomai et al. | |

FOREIGN PATENT DOCUMENTS

| | | | |
|---|---|---|---|
| JP | 58-113901 A | | 7/1983 |
| JP | 60-246231 A | | 12/1985 |
| JP | 02-252629 A | | 10/1990 |
| JP | 04-016552 A | | 1/1992 |
| JP | 06048813 | * | 2/1994 |
| JP | 09-047965 A | | 2/1997 |
| JP | 09047965 | * | 2/1997 |
| JP | 3639822 B2 | | 5/2003 |
| JP | 2005-272946 A | | 10/2005 |
| JP | 2006-053180 A | | 2/2006 |
| JP | 2006-206359 A | | 8/2006 |
| JP | 2007031208 | * | 2/2007 |
| JP | 2008195593 | * | 8/2008 |
| WO | WO-2006/137199 A1 | | 12/2006 |
| WO | WO-2007/058318 A1 | | 5/2007 |

OTHER PUBLICATIONS

Submission of Information received on Jun. 20, 2012 by the Japanese Patent Office to the corresponding Japanese Patent Application No. 2009-546999.

* cited by examiner

US 8,298,975 B2

SINTERED COMPACT, PROCESS FOR PRODUCTION THEREOF, AND OPTICAL ELEMENT

CROSS-REFERENCE TO RELATED APPLICATIONS

This U.S. National stage application claims priority under 35 U.S.C. §119(a) to Japanese Patent Application No. 2008-135823, filed in Japan on May 23, 2008, the entire contents of which are hereby incorporated herein by reference.

TECHNICAL FIELD

The present invention relates to a sintered body, a method for manufacturing same, and an optical component, and particularly relates to a sintered body having a ceramic base material, a method for manufacturing the sintered body, and an optical component provided with the sintered body.

BACKGROUND ART

In Japanese Laid-open Patent Application No. 58-113901 (Patent Document 1), a method is given for predicting the amount of deformation due to the internal stress of a covering layer before a deposition layer has been used to cover an elastic substrate, and for deforming the substrate surface by that amount in the opposite direction in advance and preventing subsequent deformation and detachment of the layer.

In Japanese Patent No. 3639822 (Patent Document 2), in order to prevent detachment of a substrate and a covering layer, a method is given for providing an adhesive layer to the boundary surface between the two and forming the covering above into a multi-layered structure, whereby the internal stress of all of the layers is alleviated.

In Japanese Laid-open Patent Application No. 2006-053180 (Patent Document 3), an optical apparatus is given. The optical apparatus comprises an optical element having high transmittance across a wide bandwidth, wherein layers having high and low indices of refraction have been layered.

Japanese Laid-open Patent Application No. 2-252629 (Patent Document 4) discloses a method wherein a die is affixed to an optical element that has been hot-press molded to the net dimensions, whereupon heating is performed under applied pressure followed by cooling under low pressure so that the die can be removed with minimal complication and without compromising the structural precision.

In Japanese Laid-open Patent Application No. 60-246231 (Patent Document 5), graphite is used as the material for upper and lower dies used when press-molding a glass lens.

In "Precision Processing of Fine Ceramics" (Non-Patent Document 1), fine ceramics are ground and polished, whereby an altered layer is formed on the processed surface.

In "Optical Characteristics of a Dense ZnS Sintered Body Allowing Infrared Transmittance" (Non-Patent Document 2), the crystalline organization of a polished ZnS sintered body is given (p. 76, FIG. 8).

In "Techniques for Testing Optical Elements and Structures" (Non-Patent Document 3), a method is given for measuring the warping (measuring the surface deflection) of a lens.

[Prior Art Documents]
(Patent Documents)

SUMMARY OF THE INVENTION

Problems which the Invention is Intended to Solve

Processing ceramics is labor intensive, and therefore streamlining has conventionally been attempted by molding a net shape or near-net shape using hot-pressing or the like and omitting processing. Such net shapes or near-net molding is often implemented for ceramic articles for which processing is labor-intensive, particularly lenses and other optical articles. In net-molded articles, the sintered, unmachined, and unprocessed surface is used as a functional surface, but compressive stress due to heat contraction is retained in the surface. In surfaces that have been processed, an altered layer is produced in the processed surface, as described in Non-Patent Document 1. Compressive stress remains in the altered layer on the surface.

Surfaces retaining compressive stress readily deform when used as functional surfaces. Problems are also presented in that, when covering the functional surface with another material or joining another material to the functional surface, the covering or joining boundary surface detaches. Even when attempting to use a covering for, e.g., improving corrosion resistance, if the covering layer has a larger thermal expansion coefficient than the base material, subsequent heating results in forces acting to pull apart the base material and the surface layer, and reduces the adhesive force. Combinations of base material and surface layer may therefore be inherently limited. Consequently, designs that take measures for alleviating stress according to the conditions involved are necessary (e.g., Patent Documents 1 through 3). Suitable stress-alleviating measures are also necessary for the use of the polished surface of the zinc sulfide sintered body described in Non-Patent Document 2.

As described above, designs that take into consideration the residual compressive stress in the functional surface have conventionally needed to be developed when forming a surface layer having a special function on the functional surface of a sintered body. The durability, structural precision, or other functions of the surface layer may therefore be incompatible with the adhesion of the surface layer and the base material. Consequently, there has been a need to develop a sintered body allowing a high degree of freedom for the design of the surface layer.

A configuration capable of resolving these problems is not described in Patent Documents 4 and 5. In, e.g., Patent Document 4, the optical element is assumed to be formed from glass, and the assumptions and configuration are completely different from the invention of the present application. The material of the upper and lower dies used for press-molding a glass lens is described in Patent Document 5, as well, and the concepts of the invention of the present invention are not described or suggested.

The present invention was devised in light of these problems, and it is an object of the present invention to provide a sintered body that does not readily deform during use and that allows a high flexibility for the design of surface layers, a method for manufacturing the sintered body, and an optical component comprising the sintered body.

Means Used to Solve the Above-Mentioned Problems

The sintered body according to the present invention is a sintered body having a ceramic base material, wherein residual stress is absent in a surface or is oriented in a tensile direction.

According to the above configuration, residual stress is not present in the compressive direction in the surface of the sintered body, and therefore effects are exhibited such that deformation does not readily occur during use of the sintered body, and the flexibility for the design of the surface layers is high.

In the aforedescribed sintered body, an unprocessed surface is preferably provided to the surface of the base material. "An unprocessed surface" means "a surface that has not been subjected to mechanical processes such as cutting and polishing or to surface treatments such as coating, heat treatment, and chemical treatments." The unprocessed surface may be provided to the entire surface of the base material or to a part of the surface of the base material.

The surface of the base material is generally subjected to polishing or other processes, whereby compressive stress tends to be retained in the surface of the base material. Consequently, an "unprocessed surface" is provided to at least a part of the surface of the base material, as described above, whereby the compressive stress retained in the surface of the sintered body can be minimized.

In the aforedescribed sintered body, the residual stress is preferably tensile stress that is equal to or greater than 1 MPa.

When the residual stress (in the tensile direction) of the surface of the sintered body is less than 1 MPa, the sintered body will not readily disaggregate on breaking, and determining whether the sintered body needs to be replaced based on the breakage may be difficult. Consequently, the residual stress in the tensile direction is made to be 1 MPa or more as described above, thereby providing a sintered body allowing for the necessity of replacement to be readily determined.

As an example, in the aforedescribed sintered body, the base material contains at least material selected from the group consisting of zinc sulfide, germanium, zinc selenide, calcium fluoride, and spinel.

The method for manufacturing a sintered body according to the present invention is a method for manufacturing a sintered body for manufacturing a sintered body having a predetermined shape, the sintered body having a ceramic base material, the method comprising a step for preparing a ceramic preform; a step for using a predetermined mold having an upper die and a lower die to hot-press the ceramic preform to form a pressure-sintered body; and a step for cooling the pressure-sintered body while applying a pressure load of approximately 5% or more and 100% or less (and preferably 20% or more and 40% or less) of a pressure load applied during the step for forming the pressure-sintered body.

According to the method above, a predetermined pressure load is applied to the pressure-sintered body in the step for cooling the pressure-sintered body, whereby tensile stress can be produced in the surface of the sintered body after cooling. Residual stress is therefore not present in the surface in the compressive direction, and a sintered body that does not readily deform during use is provided. The method above also allows the surface to be formed without any residual stress in the compressive and tensile directions.

In the aforedescribed method for manufacturing a sintered body, at least one of the upper die and the lower die preferably has a lower than a thermal expansion coefficient of the sintered body.

Tensile stress can thereby be readily produced in the surface of the sintered body.

An optical component according to the present invention comprises the aforedescribed sintered body or a sintered body manufactured by the aforedescribed method for manufacturing a sintered body. An optical component provided with a sintered body that does not readily deform can thereby be obtained.

The sintered body according to the present invention can also be used in, e.g., high-accuracy precision components in addition to optical components. Alumina, zirconia, silicon nitride, silicon carbide, or the like may be used as the base material in addition to the materials mentioned above.

Effect of the Invention

According to the present invention, there can be provided a sintered body that does not readily deform during use and that allows a high flexibility for the design of surface layers.

DETAILED DESCRIPTION OF THE INVENTION

Embodiments and examples of the present invention will be described below. The same reference notation will be applied to identical or corresponding portions, and descriptions thereof may not be repeated.

Any representation of item quantities, volumes, or other parameters in the embodiments and examples described below do not necessarily limit the scope of the present invention to such parameters, except when stated otherwise. The various configuration elements in the embodiments and examples below are also not necessarily essential to the present invention, except when stated otherwise. When a plurality of embodiments and examples is present below, the appropriate combinations of the configurations of the various embodiments and examples are as originally planned, except when stated otherwise.

Figure 1:
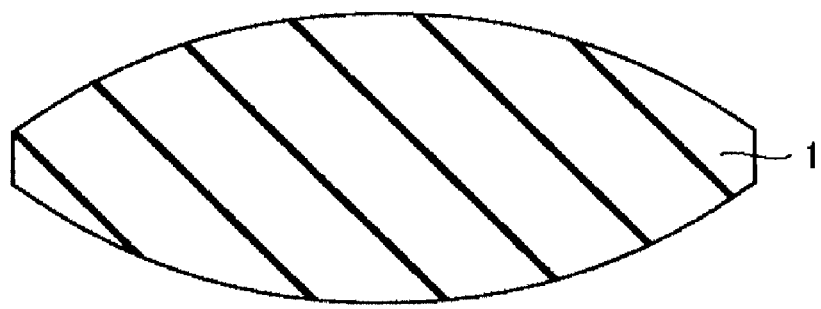
FIG. 1 is a diagram that shows an optical component used as a sintered body according to one embodiment of the present invention.

FIG. 1 is a diagram that shows an optical component used as a sintered body according to one embodiment of the present invention. With reference to FIG. 1, an optical component 1 is a lens member that contains at least one material selected from the group consisting of zinc sulfide, germanium, zinc selenide, calcium fluoride, and spinel. The optical component 1 shown in FIG. 1 will be described in the present embodiment, but the scope of the "sintered body" according to the present invention is not limited by the optical component 1.

The optical component 1 according to the present embodiment is a sintered body having a ceramic base material. Residual stress is not present in the surface, or the residual stress is oriented in a tensile direction. Any kind of ceramic material may be used.

The residual stress in the surface of the ceramic is adjusted as described above, whereby the bearing strength of the ceramic base material itself is enhanced with respect to thermal or mechanical external forces. Adhesion between the base material and a covering material is also improved when covering the base material using a material that has a larger thermal expansion coefficient than the base material. Metallization layers or hard coating therefore readily release stress, and the variety of possible layer designs increases. Resistance during cycles of heating and cooling is also improved.

The base material may also have a surface that has not been chemically or physically processed beyond having been formed by hot-pressing or another hot forming method (the surface is called the "unprocessed surface" in the present specification). The base material may be chemically or physically processed further after being formed by hot-pressing or another hot-forming method (e.g., the grain boundary may be corroded, heat treatment may be performed after cutting and polishing, other materials may be joined and composited, or a covering layer may be formed on the unprocessed surface).

The unprocessed surface may be provided to the entire surface of the ceramic base material or may be provided to a part of the surface of the ceramic base material.

The residual stress in the surface of the ceramic base material is a tensile stress of 1 MPa or more (and preferably 4 MPa or more).

When the residual stress (in the tensile direction) of the surface of the ceramic base material is less than 1 MPa, the optical component 1 will not readily disaggregate on breaking, and a comparatively large amount (e.g., approximately 50% or more) remains. Determining whether the optical component needs to be replaced based on the breakage may therefore be difficult. Consequently, the residual stress in the tensile direction is made to be 1 MPa or more (and preferably 4 MPa or more) as described above, thereby providing the optical component 1 allowing for the necessity of replacement to be readily determined.

When the residual stress (in the tensile direction) of the surface of the ceramic base material is less than 1 MPa, durability during temperature-cycle tests decreases when a coating layer is provided to the surface by vacuum deposition. Consequently, the residual stress in the tensile direction is made to be 1 MPa or more, as described above, whereby the highly durable optical component 1 can be provided.

Figure 2:
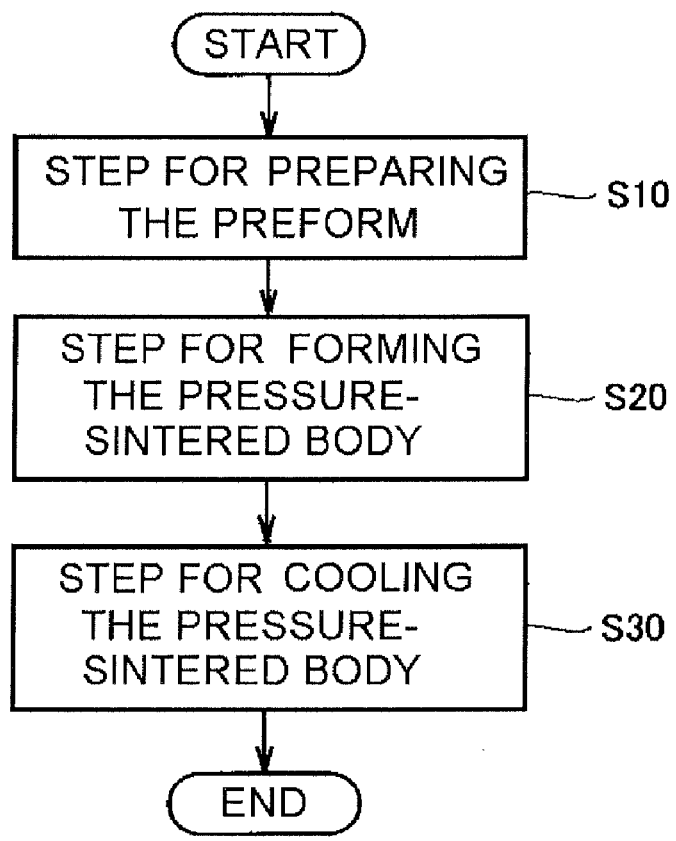
FIG. 2 is a flow chart that describes the method for manufacturing a sintered body according to one embodiment of the present invention.

FIG. 2 is a flow chart that describes a method for manufacturing the optical component 1 according to the present embodiment. With reference to FIG. 2, the method for manufacturing the optical component 1 according to the present embodiment is a method for manufacturing the optical component 1 having a ceramic base material and having a predetermined shape (a lens shape). The method comprises a step for preparing a ceramic preform (S10), a step for using a predetermined mold having an upper die and a lower die to hot-press the ceramic preform to form a pressure-sintered body (S20), and a step for cooling the pressure-sintered body while applying a pressure load of approximately 5% or more and 100% or less (and preferably approximately 20% or more and 40% or less) of the pressure load applied during the step for forming the pressure-sintered body (S30). The thermal expansion coefficient of at least one of the upper die and the lower die is preferably lower than the thermal expansion coefficient of the sintered body.

According to the method above, a predetermined pressure load is applied to the pressure-sintered body in the step for cooling the pressure-sintered body (S30), whereby tensile stress can be produced in the surface of the sintered body after cooling. Residual stress is therefore not present in the surface in the compressive direction, and a sintered body that does not readily deform during use is provided. The method above also allows the surface to be formed without any residual stress in the compressive and tensile directions.

When the pressure load during the cooling step (S30) is less than 5% of the pressure load applied during the step for forming the pressure-sintered body, the residual stress in the tensile direction may not be sufficient, pulverization may not readily occur when the optical component is broken by external forces, and determining whether the optical component needs to be replaced based on the breakage may be difficult. Durability during temperature cycle tests also readily decreases when a coating layer has been provided to the surface by vacuum deposition.

When the pressure load during the cooling step (S30) exceeds 100% of the pressure load applied during the step for forming the pressure-sintered body, the residual stress in the tensile direction may be excessive, and therefore distortion (asphericity) may occur in the molded component, and performance as an optical component will be reduced. From this perspective, the pressure load during the cooling step (S30) is more preferably 20% or more and 40% or less of the pressure load applied during the step for forming the pressure-sintered body.

The final temperature for pressing during the cooling step (S30) is preferably 90% or less of the holding temperature during the pressuring-sintering step. However, cracks may occur during deformation when this final temperature is less than 25% of the holding temperature during the pressure-sintering step. The final temperature for pressing during the cooling step (S30) is therefore preferably 25% or more and 90% or less of the holding temperature during the pressure-sintering step.

In the method for manufacturing the optical component 1 according to the present embodiment, the pressure of the cooling step (S30) does not cause stress to be retained in the compressive direction of the surface due to compression of the pressed surface of the ceramic base material. Stress is retained in the tensile direction, instead.

Stress is retained in the compressive direction of the pressed surface of the base material when cooling is performed without pressure or when cooling is performed using substantially only the low pressure of the weight of the upper die (e.g., Patent Document 4) after hot-pressing. When, e.g., these base materials are joined to other materials, or a covering film is formed, and is used as a high-temperature member, a material having a large thermal expansion coefficient cannot be used together with the conventional base-material surface, and a material having a low thermal expansion coefficient must be used, or the application of some layers for alleviating stress must be considered. Conversely, a material having a large thermal expansion coefficient can be used as the other material if the optical component 1 of the present embodiment is employed. In other words, according to the present embodiment, there can be provided the optical component 1 that does not readily deform during use and that allows a high flexibility for the design of surface layers.

Embodiment 1

All ceramic preforms in Embodiment 1 were formed from powders of ZnS (zinc sulfide), ZnSe (zinc selenide), $CaF_2$ (calcium fluoride), spinel, and Ge (germanium) having 95.5% or greater purity and having an average particle diameter of 1 to 3 µm. The ceramic preforms were presintered, whereby presintered ceramic preforms (Nos. 1 through 18 in Table 1) were prepared. These preforms have a plate shape having dimensions of 20 mm (ø) ×5 mm (thickness) or a planoconvex lens shape having dimensions of 20 mm (ø) ×6 mm (thickness) and having a radius of curvature of 18 mm. The relative densities are approximately 60%.

The ceramic preforms were then mounted between the upper and lower dies of a mold. The dies are composed of glassy carbon. The ceramic preforms were all pressed while sintering was performed for 300 seconds after the holding temperatures and holding loads given in Table 1 for the pressure-sintering step were reached. The pressure was then reduced until the holding loads given in Table 1 for the cooling step were reached. Cooling was subsequently performed until the holding temperatures (the final temperature for pressing) of the cooling step were reached while maintaining the aforementioned holding load, whereby ceramic optical components measuring 20 mm (ø)×3 mm (thickness) were obtained. The residual stress of the samples obtained was measured using a small-area X-ray stress-measuring apparatus made by Rigaku Corporation. As a result, the residual stresses shown in Table 1 were detected. Nos. 7, 10, 13, 15, and 17 in Table 1 were obtained by cutting and polishing plates measuring 20 mm (ø)×3 mm (thickness) from blocks (100 mm (ø)×30 mm (thickness)) obtained from hot-pressing the respective powders.

Favorable results were obtained upon using an FT-IR apparatus made by JASCO Corporation to measure the linear transmittance of light having a wavelength of 2.5 to 25 μm for the samples corresponding to Nos. 1 through 18 shown in Table 1. The transmittance at a wavelength of 10 μm was approximately 70% or more for ZnS (zinc sulfide), ZnSe (zinc selenide), $CaF_2$ (calcium fluoride), and spinel, and was 40% or more for Ge (germanium).

Figure 3:
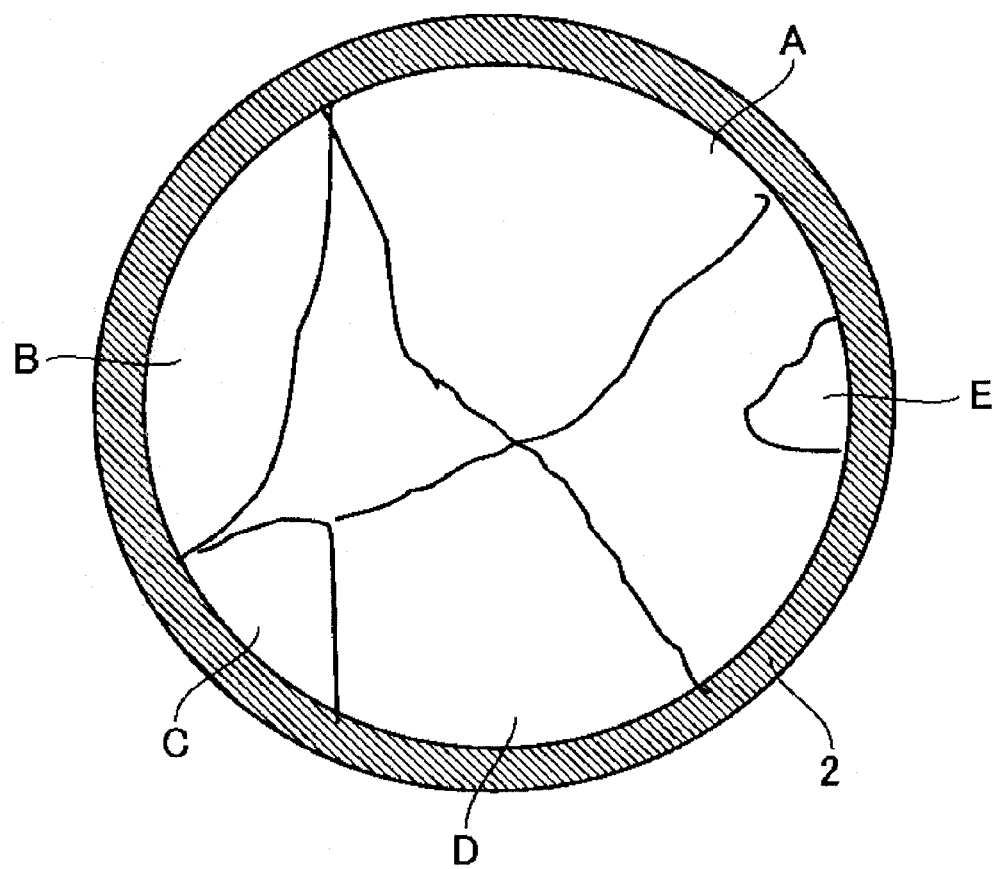
FIG. 3 is a diagram intended to illustrate a method for observing and testing the state of pulverization caused by falling copper spheres.

In other words,

The remaining-area ratio is expressed as W/S, where W is the area of broken lens fragments (A+B+C+D+E) and S is the area of effective diameter (see FIG. 3 for A, B, C, D, and E).

Measurements of distortion were also performed on the samples corresponding to Nos. 1 through 18 shown in Table 1 (for the method used to measure distortion, see "5.2.4 Determining bending (asphericity) of a surface" on pp. 88 and 89 of Non-Patent Document 3).

The results of the copper-sphere drop tests and measurements of distortion are shown in Table 2. Evaluations of the copper-sphere drop tests are denoted as follows.

1. A: Remaining-area ratio of less than 20%, where performance as a lens is completely lost
2. B: Remaining-area ratio of 20% or more and less than 50%, where performance as a lens can be confirmed to be significantly decreased
3. C: Remaining-area ratio of 50% or more and less than 80%, which is a level affecting visibility through the lens
4. D: Remaining-area ratio of 80% or more, with no effect on visibility through the lens

TABLE 1

| Sample No. | Base material | Surface | Pressure sintering step | | Cooling step | | Residual stress (direction) | Notes |
|---|---|---|---|---|---|---|---|---|
| | | | Holding temperature | Holding pressure | Holding temperature | Holding pressure | | |
| 1 | ZnS plate | Molded surface | 1000° C. | 50 MPa | 1000° C. | 0 MPa | 0 Mpa (—) | |
| 2 | ZnS plate | Molded surface | 1000° C. | 50 MPa | 800° C. | 2.5 MPa | 1 MPa (tensile) | |
| 3 | ZnS plate | Molded surface | 1000° C. | 50 MPa | 800° C. | 10 MPa | 4 MPa (tensile) | |
| 4 | ZnS plate | Molded surface | 1000° C. | 50 MPa | 800° C. | 20 MPa | 8 MPa (tensile) | |
| 5 | ZnS plate | Molded surface | 1000° C. | 50 MPa | 800° C. | 50 MPa | 15 MPa (tensile) | |
| 6-1 | ZnS plate | Molded surface | 1000° C. | 50 MPa | 250° C. | 10 MPa | 6 MPa (tensile) | |
| 6-2 | ZnS plate | Molded surface | 1000° C. | 50 MPa | 900° C. | 10 MPa | 2 MPa (tensile) | |
| 7 | ZnS plate | Polished surface | 1000° C. | 50 MPa | — | — | 20 MPa (compressive) | Comparative example |
| 8 | ZnS planoconvex lens | Molded surface | 1000° C. | 50 MPa | 800° C. | 10 MPa | 4 MPa (tensile) | |
| 9 | ZnSe plate | Molded surface | 950° C. | 50 MPa | 750° C. | 10 MPa | 4 MPa (tensile) | |
| 10 | ZnSe plate | Polished surface | 950° C. | 50 MPa | — | — | 20 MPa (compressive) | Comparative example |
| 11 | ZnSe planoconvex lens | Molded surface | 950° C. | 50 MPa | 750° C. | 10 MPa | 4 MPa (tensile) | |
| 12 | $CaF_2$ plate | Molded surface | 1250° C. | 35 MPa | 1000° C. | 10 MPa | 8 MPa (tensile) | |
| 13 | $CaF_2$ plate | Polished surface | 1250° C. | 35 MPa | — | — | 20 MPa (compressive) | Comparative example |
| 14 | Spinel plate | Molded surface | 1800° C. | 50 MPa | 1600° C. | 10 MPa | 4 MPa (tensile) | |
| 15 | Spinel plate | Polished surface | 1800° C. | 50 MPa | — | — | 20 MPa (compressive) | Comparative example |
| 16 | Ge plate | Molded surface | 850° C. | 50 MPa | 680° C. | 10 MPa | 4 MPa (tensile) | |
| 17 | Ge plate | Polished surface | 850° C. | 50 MPa | — | — | 20 MPa (compressive) | Comparative example |
| 18 | Ge planoconvex lens | Molded surface | 850° C. | 50 MPa | 680° C. | 10 MPa | 4 MPa (tensile) | |

Observations of pulverization state and measurements of distortion within the surfaces of the molded components were made using a copper-sphere drop test on the samples corresponding to Nos. 1 through 18 shown in Table 1. As shown in FIG. 3, the outer perimeter part of each sample was immobilized by a ring 2, and the samples were observed after a 50-g copper sphere had been dropped from a height of 150 mm (on the plate-shaped samples) or from a height of 500 mm (on the samples shaped as planoconvex lenses). The ratio of the area of broken lens fragments remaining within the area of the effective diameter corresponding to the [unbroken/original] lens (18 mm in this case) was calculated as the remaining-area ratio.

TABLE 2

| Sample No. | Residual stress (direction) | Copper-sphere drop test | Asphericity (quantity) | Notes |
|---|---|---|---|---|
| 1 | 0 Mpa (—) | C | 2 | |
| 2 | 1 MPa (tensile) | B | 2 | |
| 3 | 4 MPa (tensile) | A | 3 | |
| 4 | 8 MPa (tensile) | A | 10 | |
| 5 | 15 MPa (tensile) | A | 30 | |
| 6-1 | 6 MPa (tensile) | A | 9 | |
| 6-2 | 2 MPa (tensile) | B | 2 | |
| 7 | 20 MPa (compressive) | D | 3 | Comparative example |

TABLE 2-continued

| Sample No. | Residual stress (direction) | Copper-sphere drop test | Asphericity (quantity) | Notes |
|---|---|---|---|---|
| 8 | 4 MPa (tensile) | A | 6 | |
| 9 | 4 MPa (tensile) | A | 3 | |
| 10 | 20 MPa (compressive) | D | 3 | Comparative example |
| 11 | 4 MPa (tensile) | A | 3 | |
| 12 | 8 MPa (tensile) | A | 3 | |
| 13 | 20 MPa (compressive) | D | 3 | Comparative example |
| 14 | 4 MPa (tensile) | A | 3 | |
| 15 | 20 MPa (compressive) | D | 3 | Comparative example |
| 16 | 4 MPa (tensile) | A | 3 | |
| 17 | 20 MPa (compressive) | D | 3 | Comparative example |
| 18 | 4 MPa (tensile) | A | 3 | |

With reference to Table 2, the copper-sphere drop test demonstrates that visibility is unaffected when residual stress is present in the compressive direction (i.e., D in Table 2). The level at which performance is perceived to decline increases as the residual stress level approaches zero or tensile-direction residual stress. At a tensile-direction residual stress level of 4 MPa or more, lens performance is completely lost (i.e., A in Table 2).

On the other hand, distortion (shape error) occurs in the resulting molded components when residual stress in the tensile direction is too large, and performance as an optical component is reduced. Problems are also presented when using the sintered body as a mechanical component in that, e.g., deviations from the desired precision may occur, or the surfaces may not meet when, e.g., joining to another material. If practical durability and the range of amounts of distortion are taken into account, the preferred range for the residual stress in the tensile direction is approximately 1 MPa or more and 15 MPa or less (and more preferably approximately 4 MPa or more and 8 MPa or less).

A covering of approximately 0.5 μm of a predetermined coating material was then applied to the samples using vacuum deposition while the temperature of the samples was approximately 100 to 200° C. Temperature cycle tests were performed for exposing these samples to −40° C. and 80° C. for 30 minutes each in a thermostatic chamber. The front and back surfaces were then observed in their entirety using an optical microscope at a magnification factor of 10, and the number of cycles until partial detachment occurred was measured. Measurements of distortion and copper-sphere drop tests were also performed on these samples as above. The coating is not limited to a single-layer coating as described in the present example; multi-layer coatings are also possible. The film thickness is also not restricted to the thickness given in the present example.

The results of the aforedescribed tests are shown in Table 3. The evaluations of the temperature cycle tests are denoted in Table 3 as follows.

1. D: 10 or fewer cycles until partial detachment:
2. C: 11 to 500 cycles until partial detachment:
3. B: 501 to 1000 cycles until partial detachment:
4. A: 1001 or more cycles until partial detachment:

TABLE 3

| Sample No. | Base material | Thermal expansion coefficient (base material) | Coating material | Thermal expansion coefficient (coating material) | Residual stress (direction) | Temperature cycle test | Asphericity (quantity) | Copper-sphere drop test | Notes |
|---|---|---|---|---|---|---|---|---|---|
| 1 | ZnS plate | $6.5 \times 10^{-6}$ | $MgF_2$ | $10.4 \times 10^{-6}$ | 0 Mpa (—) | C | 2 | C | |
| 2 | ZnS plate | $6.5 \times 10^{-6}$ | $MgF_2$ | $10.4 \times 10^{-6}$ | 1 MPa (tensile) | B | 2 | C | |
| 3 | ZnS plate | $6.5 \times 10^{-6}$ | $MgF_2$ | $10.4 \times 10^{-6}$ | 4 MPa (tensile) | A | 3 | A | |
| 4 | ZnS plate | $6.5 \times 10^{-6}$ | $MgF_2$ | $10.4 \times 10^{-6}$ | 8 MPa (tensile) | A | 8 | A | |
| 5 | ZnS plate | $6.5 \times 10^{-6}$ | $MgF_2$ | $10.4 \times 10^{-6}$ | 15 MPa (tensile) | B | 20 | A | |
| 6-1 | ZnS plate | $6.5 \times 10^{-6}$ | $MgF_2$ | $10.4 \times 10^{-6}$ | 6 MPa (tensile) | B | 6 | A | |
| 6-2 | ZnS plate | $6.5 \times 10^{-6}$ | $MgF_2$ | $10.4 \times 10^{-6}$ | 2 MPa (tensile) | B | 2 | B | |
| 7 | ZnS plate | $6.5 \times 10^{-6}$ | $MgF_2$ | $10.4 \times 10^{-6}$ | 20 MPa (compressive) | D | 3 | D | Comparative example |
| 8 | ZnS planoconvex lens | $6.5 \times 10^{-6}$ | $MgF_2$ | $10.4 \times 10^{-6}$ | 4 MPa (tensile) | A | 6 | A | |
| 9 | ZnSe plate | $7.0 \times 10^{-6}$ | $MgF_2$ | $10.4 \times 10^{-6}$ | 4 MPa (tensile) | A | 3 | A | |
| 10 | ZnSe plate | $7.0 \times 10^{-6}$ | $MgF_2$ | $10.4 \times 10^{-6}$ | 20 MPa (compressive) | D | 3 | D | Comparative example |
| 11 | ZnSe planoconvex lens | $7.0 \times 10^{-6}$ | $MgF_2$ | $10.4 \times 10^{-6}$ | 4 MPa (tensile) | A | 3 | A | |
| 12 | $CaF_2$ plate | $19.0 \times 10^{-6}$ | $BaF_2$ | $20.0 \times 10^{-6}$ | 8 MPa (tensile) | A | 3 | A | |
| 13 | $CaF_2$ plate | $19.0 \times 10^{-6}$ | $BaF_2$ | $20.0 \times 10^{-6}$ | 20 MPa (compressive) | D | 3 | D | Comparative example |
| 14 | Spinel plate | $6.5 \times 10^{-6}$ | $SiO_2$ | $13.4 \times 10^{-6}$ | 4 MPa (tensile) | A | 3 | A | |
| 15 | Spinel plate | $6.5 \times 10^{-6}$ | $SiO_2$ | $13.4 \times 10^{-6}$ | 20 MPa (compressive) | D | 3 | D | Comparative example |
| 16 | Ge plate | $6.1 \times 10^{-6}$ | ZnS | $6.5 \times 10^{-6}$ | 4 MPa (tensile) | A | 3 | A | |
| 17 | Ge plate | $6.1 \times 10^{-6}$ | ZnS | $6.5 \times 10^{-6}$ | 20 MPa (compressive) | D | 3 | D | Comparative example |
| 18 | Ge planoconvex lens | $6.1 \times 10^{-6}$ | ZnS | $6.5 \times 10^{-6}$ | 4 MPa (tensile) | A | 3 | A | |

As is clear from the results of Table 3, useful film adhesiveness was not obtained, and detachment occurred after a small number of cycles when residual stress was present in the compressive direction (Samples 7, 10, 13, 15, 17). On the other hand, temperature-cycle durability improves when residual stress is present in the tensile direction. According to the copper-sphere drop tests, pulverization is better approaching zero residual stress or residual stress in the tensile direction than when residual stress is present in the compressive direction, as is the case in Table 2. However, problems are presented when tensile stress is too large, in that distortion (shape error) occurs in the molded components obtained, and performance as an optical component is reduced. The preferable range for residual stress in the tensile direction is determined from the ranges of useful durability and amount of distortion, as described above.

A covering of approximately 0.5 μm of a coating material that is different from above was applied to Samples 2, 7, 9, 10, and 14 through 17. The results of performing durability tests using the same cycle test as above are shown in Table 4. The same trends as above are demonstrated in Table 4.

TABLE 4

| Sample No. | Base material | Coating material | Temperature cycle test | Notes |
|---|---|---|---|---|
| 2 | ZnS plate | $SiO_2$ | A | |
| 7 | ZnS plate | $SiO_2$ | D | Comparative example |
| 9 | ZnSe plate | $SiO_2$ | A | |
| 10 | ZnSe plate | $SiO_2$ | D | Comparative example |
| 14 | Spinel plate | $MgF_2$ | A | |
| 15 | Spinel plate | $MgF_2$ | D | Comparative example |
| 16 | Ge plate | $MgF_2$ | A | |
| 17 | Ge plate | $MgF_2$ | D | Comparative example |

Figure 4:
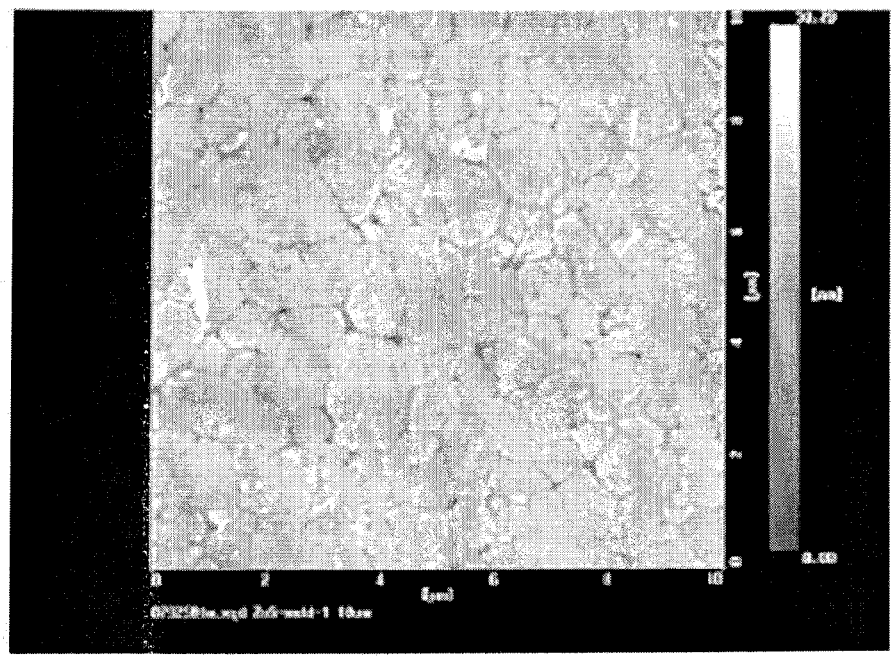
FIG. 4 is a diagram that shows an observed image of a surface according to Embodiment 1 of the present invention.
Figure 5:
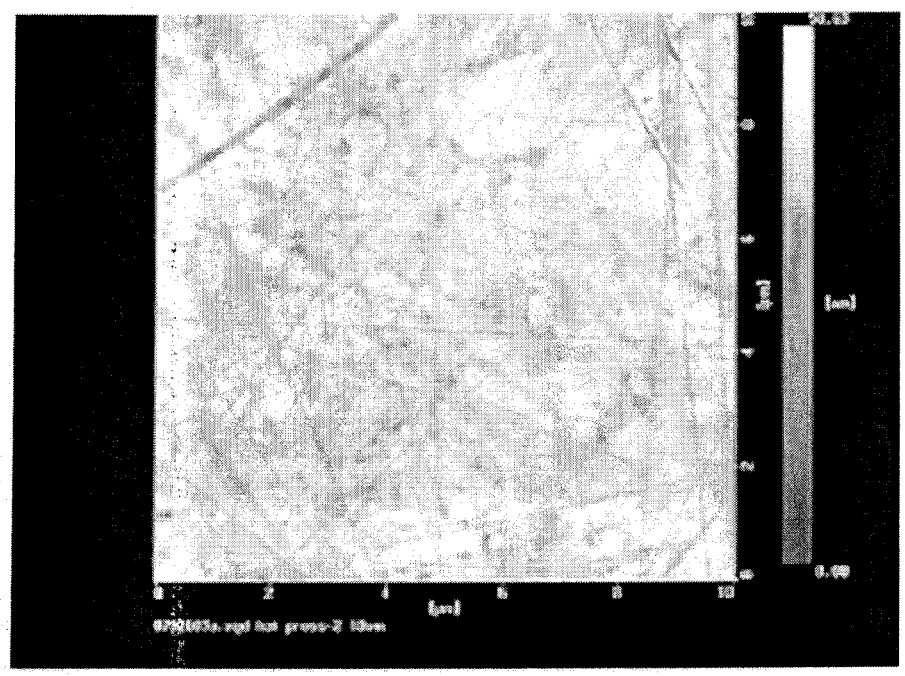
FIG. 5 is a diagram that shows an observed image of a surface according to a comparative example.

FIGS. 4 and 5 show observed images of Samples 2 (of the present example) and 7 (comparative example), respectively. Unlike in FIG. 5 (comparative example), the crystal grain boundaries can be clearly verified in FIG. 4 (of the present example), and the organizational quality of the molded component can be readily determined.

Depressions corresponding to grain boundaries are present on the surface in the sintered bodies according to the present example as described above, and therefore an anchoring effect is obtained, and the adhesiveness of the coating layer is improved.

Embodiment 2

In Embodiment 2, alumina primary sintered bodies, aluminum-nitride primary sintered bodies, and silicon-nitride primary sintered bodies were prepared. The alumina primary sintered bodies contained 0.5 wt % of a MgO sintering aid and were sintered in air at 1500° C. The aluminum-nitride primary sintered bodies contained 5 wt % of a $Y_2O_3$ sintering aid and were sintered in nitrogen gas at 1600° C. The silicon-nitride primary sintered bodies contained 5 wt % of a MgO sintering aid and were sintered in nitrogen gas at 1600° C.

These primary sintered bodies were placed in graphite molds whose surfaces were covered with diamond. All of the primary sintered bodies were subjected to hot-pressing for 20 minutes at a pressure of 70 MPa. The hot-pressing was performed in nitrogen gas at 1600° C. for the alumina primary sintered bodies and in nitrogen gas at 1700° C. for the aluminum-nitride and silicon-nitride primary sintered bodies.

Heating was then stopped, and pressure at the holding pressure given in the "Cooling step" column in Table 5 below was applied under the same atmosphere until the final temperature given in the same column was reached. The pressure was then stopped, and cooling was continued under the same atmosphere until room temperature was reached. Net-molded sintered bodies (Samples 19 through 45) having an outside diameter of approximately 20 mm and a thickness of approximately 5 mm were ultimately obtained. Samples 43 through 45 resulted from performing further mirror polishing using an abrasive grain of fine diamond on the circular surfaces of Samples 24, 32, and 40, respectively.

The residual stress of the surfaces of the samples above was confirmed using the same methods as in Embodiment 1. The results are shown in Tables 5 and 6. With reference to Tables 5 and 6, tensile stress remained in the surface, and the grain boundaries were clearly exposed on those unprocessed surfaces that were cooled to a temperature approximately 25% or more and 90% or less of the holding temperature of the pressure-sintering step while a pressure that was 5 to 100% of the hot-pressing pressure was applied.

TABLE 5

| Sample No. | Base material | Base material surface | Holding temperature of pressure sintering step | Cooling step | | Copper-sphere drop test before covering | After covering | | Notes |
| | | | | Final temperature | Holding pressure | Residual stress (direction) | | Temperature cycle test | Copper-sphere drop test | |
|---|---|---|---|---|---|---|---|---|---|---|
| 19 | Alumina plate | Molded surface | 1600° C. | Not pressed | | 20 MPa (compressive) | D | D | D | Comparative example |
| 20 | Alumina plate | Molded surface | 1600° C. | 1500° C. | 3 MPa | 10 MPa (compressive) | D | D | D | Comparative example |
| 21 | Alumina plate | Molded surface | 1600° C. | 1500° C. | 5 MPa | 5 MPa (compressive) | B | C | C | Comparative example |
| 22 | Alumina plate | Molded surface | 1600° C. | 1440° C. | 8 MPa | 1 MPa (tensile) | B | B | B | |
| 23 | Alumina plate | Molded surface | 1600° C. | 1280° C. | 30 MPa | 3 MPa (tensile) | A | A | A | |
| 24 | Alumina plate | Molded surface | 1600° C. | 1280° C. | 50 MPa | 10 MPa (tensile) | A | A | A | |
| 25 | Alumina plate | Molded surface | 1600° C. | 1280° C. | 70 MPa | 15 MPa (tensile) | A | A | A | |
| 26 | Alumina plate | Molded surface | 1600° C. | 400° C. | 75 MPa | 20 MPa (tensile) | C | C | C | |
| 27 | AlN plate | Molded surface | 1700° C. | Not pressed | | 10 MPa (compressive) | D | D | D | Comparative example |
| 28 | AlN plate | Molded surface | 1700° C. | 1600° C. | 3 MPa | 4 MPa (compressive) | D | D | D | Comparative example |
| 29 | AlN plate | Molded surface | 1700° C. | 1600° C. | 5 MPa | 2 MPa (compressive) | B | C | C | Comparative example |
| 30 | AlN plate | Molded surface | 1700° C. | 1530° C. | 8 MPa | 2 MPa (tensile) | B | B | B | |
| 31 | AlN plate | Molded surface | 1700° C. | 1360° C. | 30 MPa | 4 MPa (tensile) | A | A | A | |

TABLE 5-continued

| Sample No. | Base material | Base material surface | Holding temperature of pressure sintering step | Cooling step Final temperature | Holding pressure | Residual stress (direction) | Copper-sphere drop test before covering | After covering Temperature cycle test | After covering Copper-sphere drop test | Notes |
|---|---|---|---|---|---|---|---|---|---|---|
| 32 | AlN plate | Molded surface | 1700° C. | 1360° C. | 50 MPa | 6 MPa (tensile) | A | A | A | |
| 33 | AlN plate | Molded surface | 1700° C. | 1360° C. | 70 MPa | 8 MPa (tensile) | A | A | A | |
| 34 | AlN plate | Molded surface | 1700° C. | 450° C. | 75 MPa | 10 MPa (tensile) | C | C | C | |

TABLE 6

| Sample No. | Base material | Base material surface | Holding temperature of pressure sintering step | Cooling step Final temperature | Holding pressure | Residual stress (direction) | Copper-sphere drop test before covering | After covering Temperature cycle test | After covering Copper-sphere drop test | Notes |
|---|---|---|---|---|---|---|---|---|---|---|
| 35 | Silicon nitride plate | Molded surface | 1700° C. | Not pressed | | 25 MPa (compressive) | D | D | D | Comparative example |
| 36 | Silicon nitride plate | Molded surface | 1700° C. | 1600° C. | 3 MPa | 13 MPa (compressive) | D | D | D | Comparative example |
| 37 | Silicon nitride plate | Molded surface | 1700° C. | 1600° C. | 5 MPa | 8 MPa (compressive) | B | C | C | Comparative example |
| 38 | Silicon nitride plate | Molded surface | 1700° C. | 1530° C. | 8 MPa | 5 MPa (tensile) | B | B | B | |
| 39 | Silicon nitride plate | Molded surface | 1700° C. | 1360° C. | 30 MPa | 10 MPa (tensile) | A | A | A | |
| 40 | Silicon nitride plate | Molded surface | 1700° C. | 1360° C. | 50 MPa | 13 MPa (tensile) | A | A | A | |
| 41 | Silicon nitride plate | Molded surface | 1700° C. | 1360° C. | 70 MPa | 20 MPa (tensile) | A | A | A | |
| 42 | Silicon nitride plate | Molded surface | 1700° C. | 450° C. | 75 MPa | 25 MPa (tensile) | C | C | C | |
| 43 | polishing molded surface of Sample 24 | — | — | — | | 20 MPa (compressive) | D | D | D | Comparative example |
| 44 | polishing molded surface of Sample 32 | — | — | — | | 10 MPa (compressive) | D | D | D | Comparative example |
| 45 | polishing molded surface of Sample 40 | — | — | — | | 25 MPa (compressive) | D | D | D | Comparative example |

The same method used in Embodiment 1 was employed to perform copper-sphere drop tests using separately prepared test pieces in the present embodiment. Ten of the test pieces that were net-molded under the same conditions as above were used without being processed. The results of these copper-sphere drop tests are also included in Tables 5 and 6. The notations (A and the like) appearing in Tables 5 and 6 are identical to those used for Tables 2 and 3.

Covering layers were also formed on the sample surfaces in the present embodiment. As in Embodiment 1, films of a material having larger thermal expansion coefficients were formed and subjected to heating and cooling cycles as in Embodiment 1. The adhesive durabilities of the boundary surfaces of the coverings were compared. Chromium (a material having a thermal expansion coefficient of $11\times10^{-6}/°$ C.) was deposited on the alumina samples (a material having a thermal expansion coefficient of $8\times10^{-6}/°$ C.), titanium oxide (a material having a thermal expansion coefficient of $7.5\times10^{-6}/°$ C.) was deposited on the aluminum nitride samples (a material having a thermal expansion coefficient of $5\times10^{-6}/°$ C.), and diamond (a material having a thermal expansion coefficient of $4.5\times10^{-6}/°$ C.) was deposited on the silicon nitride samples (a material having a thermal expansion coefficient of $3\times10^{-6}/°$ C.). The thickness of the deposited film was 2 μm in all cases. Copper-sphere drop tests for confirming the ease of breakage confirmation and temperature cycle tests were performed using the same procedure as in Embodiment 1 in order to confirm the degree to which the covering layers adhered to the samples. These results are also shown in Tables 5 and 6 (see the columns corresponding to "Results of temperature cycle test after covering" and "Results of copper-sphere drop test after covering").

Embodiments and examples of the present invention were described above, but the embodiments and examples disclosed herein are, without exception, merely examples and should not be considered to be given by way of limitation. The scope of the present invention is given by the patent claims, and it is intended that all changes are included in the scope and equivalent meanings of the patent claims.

INDUSTRIAL APPLICABILITY

The present invention can be applied to, e.g., a sintered body having a ceramic base material, to a method for manufacturing a sintered body, and to optical components, high-accuracy precision components, and the like provided with the sintered body.

Key
1 Optical component
2 Ring

What is claimed is:

1. A sintered body, comprising
a ceramic base material containing a material selected from the group consisting of zinc sulfide, germanium, zinc selenide, calcium fluoride, and spinel, the ceramic base material being free of silicon nitride, the ceramic base material being shaped and sintered defining an optical component with the surface of the optical component being free of residual stress in a compressive direction, wherein the surface of the optical component is an unprocessed surface that has not been subjected to mechanical processes such as cutting and polishing, the unprocessed surface having residual stress in a tensile direction corresponding to tensile stress that is equal to or greater than 1 MPa.

2. A method for manufacturing a sintered body for manufacturing a sintered body having a predetermined shape, the sintered body having a ceramic base material, the method for manufacturing a sintered body comprising:
preparing a ceramic preform that includes a base material selected from the group consisting of zinc sulfide, germanium, zinc selenide, calcium fluoride, and spinel, the ceramic preform being free of silicon nitride;
using a predetermined mold having an upper die and a lower die to hot-press the ceramic preform to form a pressure-sintered body that defines an optical component; and
cooling the optical component while applying a pressure load of approximately 5% or more and 100% or less of a pressure load applied during the step for forming the optical component, the optical component having an unprocessed surface that has not been subjected to mechanical processes such as cutting and polishing, the surface thereof being free of residual stress in a compressive direction and the uprocessed surface having residual stress in a tensile direction corresponding to tensile stress that is equal to or greater than 1 MPa.

3. The method for manufacturing a sintered body according to claim 2, wherein at least one of the upper die and the lower die has a lower thermal expansion coefficient than a thermal expansion coefficient of the sintered body.

4. An optical component comprising the sintered body manufactured by a method for manufacturing a sintered body having a predetermined shape, the sintered body having a ceramic base material, the method for manufacturing a sintered body comprising:
preparing a ceramic preform that includes a base material selected from the group consisting of zinc sulfide, germanium, zinc selenide, calcium fluoride, and spinel, the ceramic preform being free of silicon nitride;
using a predetermined mold having an upper die and a lower die to hot-press the ceramic preform to form a pressure-sintered body that defines an optical component; and
cooling the optical component while applying a pressure load of approximately 5% or more and 100% or less of a pressure load applied during the step for forming the optical component, the optical component having an unprocessed surface that has not been subjected to mechanical processes such as cutting and polishing, the surface thereof being free of residual stress in a compressive direction and the unprocessed surface having residual stress in a tensile direction corresponding to tensile stress that is equal to or greater than 1 MPa.

5. The method for manufacturing a sintered body according to claim 2, wherein the using of the predetermined mold is such that the pressure-sintered body is provided with a predetermined shape thereby defining the sintered body.

6. The method for manufacturing a sintered body according to claim 5, wherein the using of the predetermined mold is such that the predetermined shape is a lens shape.

7. The sintered body according to claim 1, wherein the ceramic base material is provided with a predetermined shape thereby defining the sintered body.

8. The sintered body according to claim 7, wherein the predetermined shape is a lens shape.

* * * * *